(12) United States Patent
Ikeda (10) Patent No.: US 8,285,009 B2
(45) Date of Patent: Oct. 9, 2012

(54) FINGERPRINT INPUT APPARATUS (75) Inventor: Munehiro Ikeda, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 1451 days.

(21) Appl. No.: 11/055,662

(22) Filed: Feb. 11, 2005

(65) Prior Publication Data

US 2005/0180616 A1    Aug. 18, 2005

(30) Foreign Application Priority Data

Feb. 12, 2004  (JP) ................................ 2004-035067

(51) Int. Cl.
G06K 9/00 (2006.01)
G06K 9/36 (2006.01)
(52) U.S. Cl. ...................... 382/124; 382/284; 382/294
(58) Field of Classification Search .......... 382/124–126, 382/220, 284, 294
See application file for complete search history.

(56) References Cited

U.S. PATENT DOCUMENTS

| | | | |
|---|---|---|---|
| 6,289,114 B1 * | 9/2001 | Mainguet | 382/124 |
| 2002/0003892 A1 * | 1/2002 | Iwanaga | 382/124 |
| 2002/0012455 A1 * | 1/2002 | Benckert | 382/124 |
| 2003/0002718 A1 * | 1/2003 | Hamid | 382/124 |
| 2003/0123715 A1 * | 7/2003 | Uchida | 382/124 |
| 2003/0126448 A1 * | 7/2003 | Russo | 713/186 |
| 2003/0138136 A1 * | 7/2003 | Umezaki et al. | 382/124 |
| 2003/0161510 A1 * | 8/2003 | Fujii | 382/124 |
| 2004/0052407 A1 * | 3/2004 | Kawabe | 382/124 |
| 2004/0114784 A1 * | 6/2004 | Fujii | 382/124 |
| 2006/0067565 A1 * | 3/2006 | Ikeda | 382/124 |
| 2007/0009141 A1 * | 1/2007 | Ikeda | 382/124 |

FOREIGN PATENT DOCUMENTS

| | | |
|---|---|---|
| JP | H09-091410 A | 4/1997 |
| JP | 10-91769 A | 4/1998 |
| JP | H10-093808 A | 4/1998 |
| JP | H10-255050 A | 9/1998 |
| JP | H10-294855 A | 11/1998 |
| JP | 2000-11154 A | 1/2000 |
| JP | 2001-177714 A | 6/2001 |
| JP | 2001-184490 A | 7/2001 |
| JP | 2003-248820 A | 9/2003 |
| JP | 2003-248828 A | 9/2003 |

* cited by examiner

Primary Examiner — Matthew Bella
Assistant Examiner — Julian Brooks
(74) Attorney, Agent, or Firm — Sughrue Mion, PLLC

(57) ABSTRACT

A fingerprint input apparatus for providing a plurality of inputs while moving a finger to acquire a fingerprint image, the fingerprint input apparatus determining an intersection of the plurality of input partial fingerprint images to calculate a relative location between the plurality of partial fingerprint images on the basis of the intersection and outputting the calculated relative location with the plurality of partial fingerprint images to an external device. The intersection of the plurality of partial fingerprint images is obtained, for example, on the basis of a density distribution of dots constituting each of the image. The relative location is at least one of the moving direction, the moving distance, and the angle of rotation. Thereby, there is no movable part and thus it eliminates a need for providing the external device with software processing for calculating the relative location of the partial fingerprint images, thereby achieving downsizing and power saving of the apparatus.

12 Claims, 5 Drawing Sheets

FINGERPRINT INPUT APPARATUS

BACKGROUND OF THE INVENTION

1. Field of the Invention

The present invention relates to a fingerprint input apparatus for optically reading a fingerprint, and more particularly to a fingerprint input apparatus having an input section, which is smaller in area than a finger to be an input object, and requiring a plurality of input times while moving the finger in order to obtain a fingerprint image of the entire finger.

2. Related Background Art

Conventionally, a fingerprint has been used as important information to identify an individual person. In recent years, however, a fingerprint is optically input and electronically processed as image information.

A fingerprint input section in a fingerprint verification/authentication device for use in this type of processing is preferably as compact as possible for mounting. If the fingerprint input section, however, is smaller in area than the finger, fingerprint information of the entire finger cannot be obtained at a time. Therefore, if a fingerprint input section smaller than the finger, it is necessary to enter partial fingerprint information acquired from different parts of the finger a plurality of number of times by moving the finger on the input section, to calculate relative locations of the partial fingerprint information by an arithmetic operation, and to reconstruct the entire fingerprint information from the partial fingerprint information.

Figure 5:
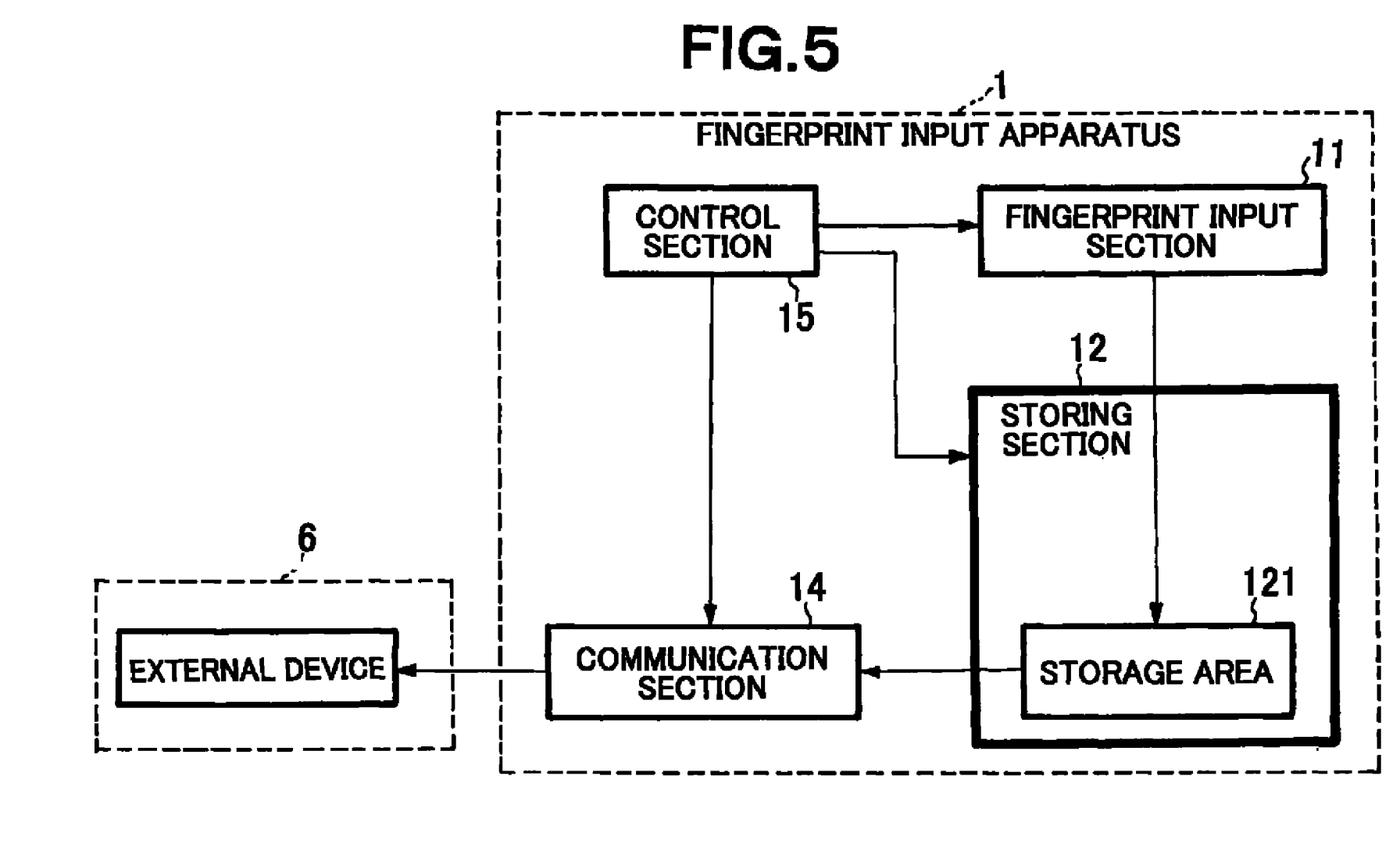
FIG. 5 is a schematic block diagram showing a configuration of a conventional fingerprint input apparatus.

Referring to FIG. 5, there is shown a block diagram of a configuration of the conventional fingerprint input apparatus requiring an acquisition of these partial fingerprint images.

The conventional fingerprint input apparatus 1 shown in FIG. 5 comprises: a fingerprint input section 11 for acquiring partial fingerprint images from a finger; a storing section 12 having a storage area 121 for storing the acquired partial fingerprint images; a communication section 14 connected to an external device 6; and a control section 15 for controlling operations of these sections 11, 12, and 14. With this configuration, the fingerprint input section 11 acquires the partial fingerprint images of the finger and stores them into the storing section 12, so that the partial fingerprint images are output from the storing section 12 to the external device 6 via the communication section 14, under the control of the control section 15.

The fingerprint input apparatus 1 does not include an operation section. The storing section 12 is only used as a temporary storage location for the partial fingerprint images (In some other cases, the fingerprint input device 1 does not include the storing section 12 like the operation section, either). Therefore, signals output from the fingerprint input apparatus 1 are only of the partial fingerprint images.

The external device 6, which is connected to the fingerprint input apparatus 1 and disposed separately from the fingerprint input apparatus 1, performs the arithmetic operation for reconstructing the entire fingerprint information from the partial fingerprint information output from the fingerprint input apparatus 1 in this manner. The external device 6 specifically performs the operation of calculating a relative location between a certain partial fingerprint image and other partial fingerprint images, in other words, a distance, a direction, or an angle of rotation of the finger movement between the current partial fingerprint image and the past partial fingerprint images. To calculate the relative location between both partial fingerprint images by this operation, the partial fingerprint images need to include information acquired from the same position of the finger.

On the other hand, the fingerprint input section 11 is required to be as compact as possible. This causes an area of the partial fingerprint images that can be acquired at a time to be inevitably small. In this case, the time intervals for acquiring the partial fingerprint images need be considerably short in order to calculate the relative location so as to correspond to an actual finger movement speed.

Figure 6:
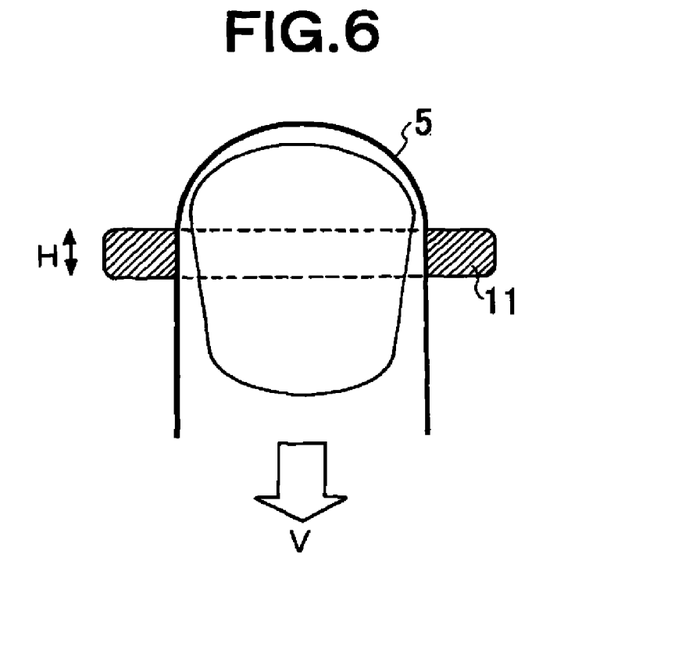
FIG. 6 is a diagram showing a relation between a finger and a fingerprint input section.

Referring to FIG. 6, there is shown a diagram illustrating a relation between the finger and the finger input section. For example, if the vertical length of the fingerprint input section 11 is H mm shown in FIG. 6 and the movement speed of the finger 5 is V mm/sec in the direction indicated by an arrow, an upper limit T sec of the time intervals for acquiring images necessary for the partial fingerprint images sequentially acquired to include information from an identical part of the finger can be calculated by T=H/V. The length H of the fingerprint input section 11 that is practically small enough is considered about 0.5 mm. Moreover, the fingerprint input section 11 cannot be considered practical unless it can cope with the finger movement speed v of 200 to 300 mm/sec. The upper limit T of the time intervals for acquiring the images in this case is within a range of 2.5 to 1.7 ms (T=2.5 to 1.7 [ms]) on the basis of the above equation.

If a sequential operation is performed whenever a partial fingerprint image is acquired, it is necessary to communicate the fingerprint image and to calculate the distance during the time T. It requires a great deal of computing power. This inhibits the external device 6 to perform any other processing during the input of the fingerprint. Therefore, processing of converting the fingerprint images to information for verification and authentication or processing of performing the verification and authentication is started only after the input of the fingerprint completely ends. Thereby, a user needs to await the end of the processing to obtain a result of the verification and authentication, which makes the apparatus unavailable.

Alternatively, there can be a processing method in which only image acquisition is performed during the fingerprint input and the distance calculations are done collectively after the end of the input. This method, however, makes no difference in that the information conversion, verification and authentication can be performed only after the end of the fingerprint input, and a user is still kept waiting until the end of the processing. Furthermore, this method requires a large storage area for storing all of the acquired partial fingerprint images. The reservation of the storage area has a problem of causing an increase in size of the external device or an increase in power consumption.

Moreover, naturally the external device 6 requires software for an image comparison operation or a distance calculation. Therefore, it has caused problems of complicating the software and requiring an area for storing the software and the time for performing the image comparison operation collectively after acquiring all images.

As known examples for resolving these problems, there are means suggested in JP-A-2001-184490 and JP-A-H10 (1998)-255050. These means measure a moving direction and distance of a finger movement by providing a detecting device, which is different from that for image acquisition, such as a roller for causing the finger to contact with an input section or a slider with a finger holder fixed.

The means disclosed in the JP-A-2001-184490 and JP-A-H10(1998)-255050, however, cause an increase in size of the fingerprint input apparatus due to the additional detecting device undesirably. Furthermore, these means each have a movable part, which presents a problem of causing concern about a breakdown or a trouble and therefore inhibiting an increase in reliability of the apparatus.

SUMMARY OF THE INVENTION

Therefore, an object of the present invention is to achieve downsizing and power saving of an apparatus by eliminating a movable part and eliminating a need for software processing of an external device for calculating a relative location of the partial fingerprint images.

In order to accomplish the foregoing object, according to the present invention, there is provided a fingerprint input apparatus for inputting a plurality of partial fingerprint images constituting a fingerprint image through a plurality of input times while moving a finger to acquire the fingerprint image, the fingerprint input apparatus comprising: an operation section configured to determine an intersection of the plurality of input partial fingerprint images, and to calculate a relative location between the plurality of partial fingerprint images on the basis of the intersection; and a communication section configured to output the calculated relative location with the plurality of partial fingerprint images to an external device.

The operation section can assume that one of the foregoing two partial fingerprint images is an object of the calculation and calculate its relative location to the other.

The plurality of partial fingerprint images may be three or more partial fingerprint images. The operation section can assume that any one of the three or more partial fingerprint images is an object of the calculation and calculate its relative locations to the remaining partial fingerprint images and can weight the relative locations.

In the present invention, the fingerprint input apparatus can further comprise: an input section configured to input the plurality of partial fingerprint images; and a storing section having a plurality of storage areas corresponding to the plurality of partial fingerprint images.

The relative location may be at least one of a moving direction, a moving distance, and an angle of rotation.

The operation section may determine the intersection on the basis of a density distribution of dots constituting each of the partial fingerprint images. In this case, the operation section can determine the intersection by detecting the minimum sum total of differences in density of the dots constituting each of the partial fingerprint images.

The operation section may determine the intersection on the basis of a vector distribution of fingerprint ridges constituting each of the partial fingerprint images.

The operation section may determine the intersection on the basis of a frequency distribution in each of the partial fingerprint images.

The first effect of the present invention is to eliminate a need for a special device that has conventionally been required in the fingerprint input apparatus so as to detect the finger moving direction and distance, by which a more inexpensive and compact fingerprint input apparatus can be manufactured and supplied.

The second effect of the present invention is to eliminate a movable part of the device no longer necessary, thereby achieving a very reliable apparatus free from a breakdown and a trouble.

Furthermore, the third effect of the present invention is to eliminate a need for software processing for calculating the relative location between the partial fingerprint images, which has been required for the external device connected to the fingerprint input apparatus, by performing the calculation of the relative location between the partial fingerprint images, which has conventionally been performed by the external device, using the fingerprint input apparatus, thereby enabling simplification of software for the external device. This permits a reduction in a volume of software to be stored, thereby achieving downsizing and power saving of the apparatus.

Still further, the fourth effect of the present invention is to reduce the processing that has been performed by the external device again at the time of an input of the fingerprint, thereby enabling an execution of another processing such as, for example, image processing, which has conventionally been performed only after the end of the input of the fingerprint, during the input of the fingerprint by using the surplus processing power. Therefore, the entire processing time is reduced, thereby enabling a construction of a user-friendly apparatus that requires only a short period of time during which a user awaits the end of processing.

DETAILED DESCRIPTION OF THE PREFERRED EMBODIMENTS

The preferred embodiments of the present invention will now be described in detail hereinafter with reference to the accompanying drawings.

[First Embodiment]

Figure 1:
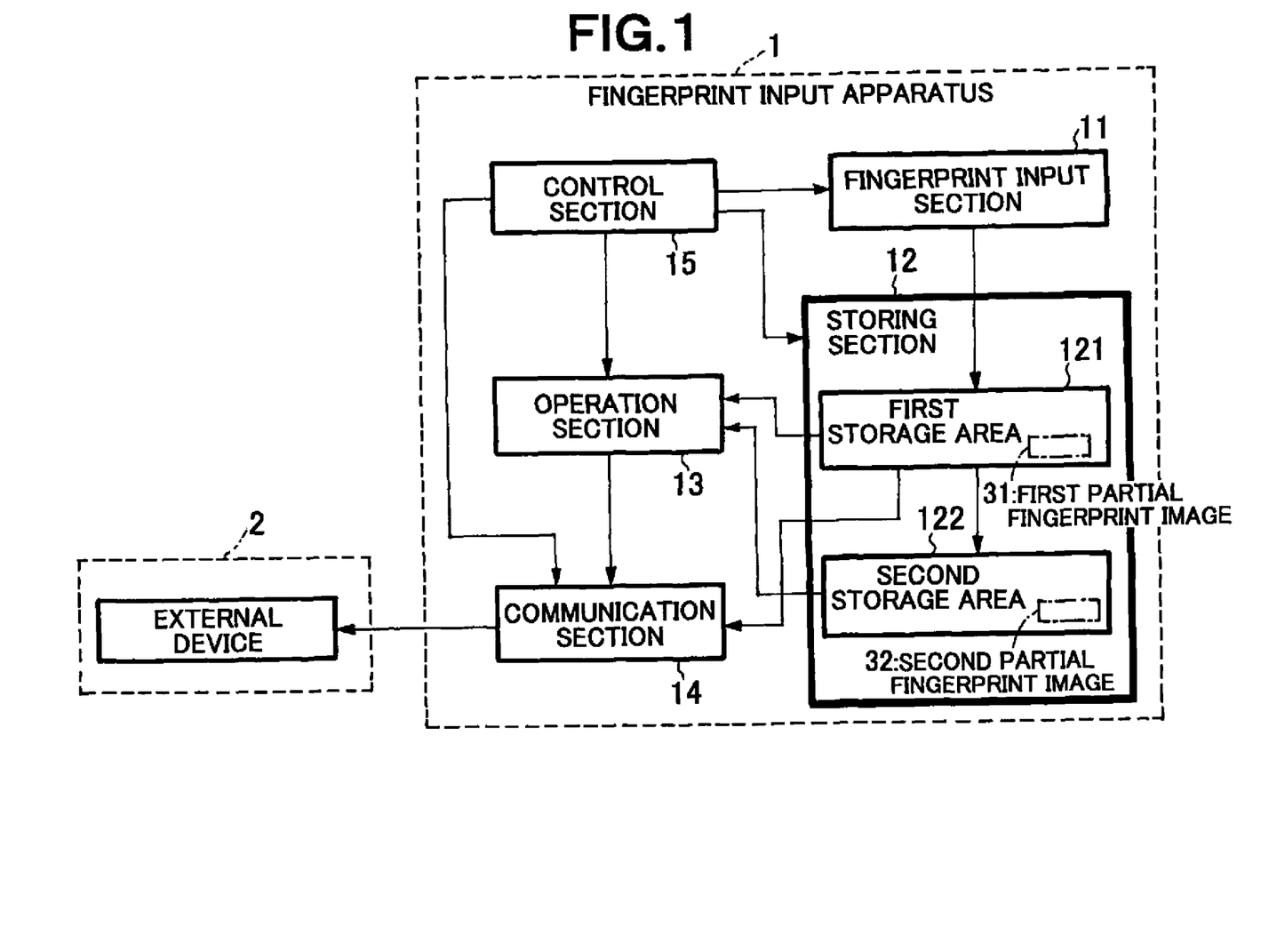
FIG. 1 is a schematic block diagram showing a configuration of a fingerprint input apparatus according to the first embodiment of the present invention.

Referring to FIG. 1, there is shown a block diagram of a configuration of a fingerprint input apparatus according to the first embodiment.

The fingerprint input apparatus of the first embodiment has an input section smaller in area than the area of an entire fingerprint of a finger to be input and it is for use in providing a plurality of inputs to enter a plurality of partial fingerprint images constituting a fingerprint image while moving the finger to acquire a fingerprint image of the entire finger.

As shown in FIG. 1, the fingerprint input apparatus 1 comprises: a fingerprint input section 11 for acquiring the partial fingerprint images from the finger; a storing section 12 for storing the acquired partial fingerprint images; an operation section 13 for performing calculations of the partial fingerprint images stored in the storing section 12; a communication section 14 connected to an external device 2; and a control section 15 for controlling operations of these sections 11 to 14.

Any type of fingerprint sensor is applicable to the fingerprint input section 11. For example, there is exemplified an optical sensor for reading a fingerprint ridge pattern by converting the amount of light reflected to electrical signals by utilizing the optical reflection. Besides, it is also possible to use a capacitance semiconductor sensor for reading a fingerprint ridge pattern by measuring an electrostatic capacity by utilizing a difference in potential caused by a patterned indented surface of the finger, or to use a sensor utilizing an in-finger scattered light direct reading method of reading a fingerprint ridge pattern by irradiating the finger with light and reading the scattered light within the finger.

The storing section 12 has a capacity permitting storage of the plurality of partial fingerprint images to be read by the fingerprint input section 11. In this embodiment, the storing section 12 has storage areas for storing two partial fingerprint images, respectively, as described later.

The operation section 13 can calculate the relative location indicating in which direction, how far (distance), or by what angle of rotation an object partial fingerprint image for calculating the relative location, which is stored in the storing section 12, is distant from a reference partial fingerprint image, which is also stored in the storing section 12. If it is assumed that no change will occur in one of the moving direction, the moving distance, and the angle of rotation of the finger, values of the remainders need be calculated only. In addition, the moving direction and the angular speed of rotation of the finger can be calculated by measuring the time.

The communication section 14 can output the partial fingerprint images stored in the storing section 12 and the relative location information of the partial fingerprint image calculated by the operation section 13 to the external device 2.

The control section 15 comprises, for example, a microcomputer having a central processing unit (CPU). The CPU executes a preset control program, thereby giving a control command at a given operation timing to the sections 11 to 13 to control their operations.

Subsequently, the operations in this embodiment will be described with reference to FIGS. 1 to 3. A relation between the finger and the fingerprint input section 11 is as shown in FIG. 6 similarly to the foregoing conventional one.

The fingerprint input section 11 is for use in reading a fingerprint image, with a frame defining a range of the image. The fingerprint input section 11, however, is smaller in area than the finger 5 as shown in FIG. 6. Therefore, only a part of the entire fingerprint can be acquired with a one-time input.

Upon an input of the fingerprint into the fingerprint input section 11, a partial fingerprint image of the one-time input is stored in the storing section 12. The storing section 12 has a capacity permitting storage of at least two partial fingerprint images. In the example shown in FIG. 1, the storing section 12 has an appropriate capacity for the two partial fingerprint images and has two storage areas 121 and 122. One storage area (hereinafter, referred to as "the first storage area") 121 is for use in storing the partial fingerprint image to be an object of calculating the relative location, storing the latest partial fingerprint image here. The other storage area (hereinafter, referred to as "the second storage area") 122 is for use in storing the partial fingerprint image to be a reference for calculating the relative location, storing the second latest partial fingerprint image.

Figure 2:
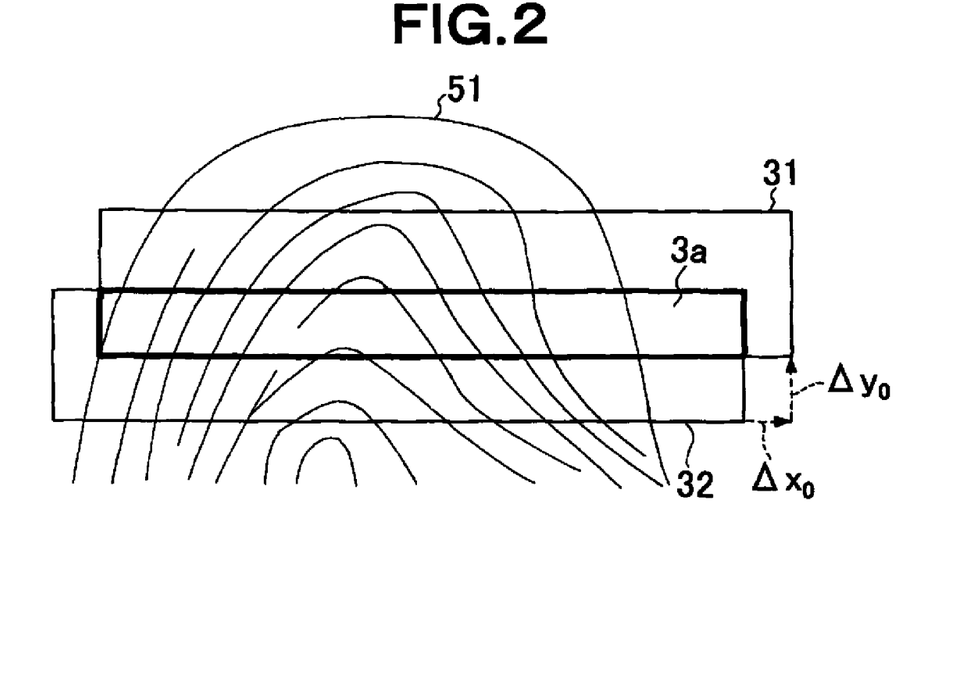
FIG. 2 is a diagram showing partial fingerprint images stored in two storage areas within a storing section.

Referring to FIG. 2, there is shown a diagram of partial fingerprint images stored in the two storage areas.

Solid lines 51 in FIG. 2 indicate ridges constituting a fingerprint pattern. Rectangles 31 and 32 in FIG. 2 indicate ranges of a one-time fingerprint input by the fingerprint input section 11, showing the partial fingerprint images stored in the first and second storage areas 121 and 122, respectively (hereinafter, referred to as "the first and second partial fingerprint images"). A difference in relative location between the first and second partial fingerprint images 31 and 32 indicates that the relative location between the finger 5 and the fingerprint input section 11 deviates every time input is made.

Subsequently, the operation section 13 compares the first partial fingerprint image 31, which is an object of calculating the relative location, stored in the first storage area 121 with the second partial fingerprint image 32, which is a reference for calculating the relative location, stored in the second storage area 122 and calculates the relative location of the first partial fingerprint image 31 to the second partial fingerprint image 32.

The relative location is calculated by checking where the information acquired from the reference image exists in the object image for the calculation. The information acquired from the image can be a vector distribution of the fingerprint ridges, a density distribution of dots constituting the image, a frequency distribution, or the like. Any of these methods or any other method can be used.

As one such example, the following describes a calculation of the relative location where the object image for the calculation is the first partial fingerprint image 31 and the reference image is the second partial fingerprint image 32 by using the density distribution of the dots in the images.

Here, an image difference D between the two partial fingerprint images 31 and 32 is defined by using an equation 1.

$$D(\Delta x, \Delta y) = \sum_{Y} \sum_{X} \{P_1(X - \Delta x, Y - \Delta y) - P_2(X, Y)\} \quad \text{[Eq. 1]}$$

where P1 (X, Y) and P2 (X, Y) are density data of the dots specified by means of coordinates (X, Y) within the two partial fingerprint images 31 and 32. It is assumed here that one partial fingerprint image differs from the other in direction and distance, in other words, it moves in parallel with the other. Specifically, the image difference D (Δx, Δy) is a sum total or summation of difference in density of the corresponding dots in an overlapped area between the first partial fingerprint image 31 and the second partial fingerprint image 32 with a difference of (Δx, Δy).

As shown in FIG. 2, the overlapped area 3a is an intersection included in the first partial fingerprint image 31 and the second partial fingerprint image 32. In the example shown in FIG. 2, the relative location of the first partial fingerprint image 31 to the second partial fingerprint image 32 is defined as (Δx0, Δy0). Therefore, the value of the image difference D (Δx0, Δy0) is ideally zero.

By calculating the image difference D (Δx, Δy) at various coordinates (Δx, Δy) and searching for a pair of (Δx, Δy) whose value is zero in this manner, the relative location of the first partial fingerprint image 31 to the second partial fingerprint image 32 can be obtained. An actual partial fingerprint image includes a certain amount of noise. Therefore, the image difference D (Δx0, Δy0) is not always zero. By searching for a pair of (Δx, Δy) having the minimum absolute value of the image difference D (Δx, Δy), however, it is possible to obtain (Δx0, Δy0).

In the foregoing example, the description has been made for a case where the first partial fingerprint image 31 is not rotated relative to the second partial fingerprint image 32, for simplification of the explanation. It is also possible, however, to calculate an angle of rotation by assuming an image difference D (Δx, Δy, t) with the angle of rotation t added to the parameter of the foregoing image difference D (Δx, Δy) and searching for a set of (Δx0, Δy0, t0) having the value closest to zero in the same manner.

Subsequently, the communication section 14 receives the first partial fingerprint image 31 and the relative location (Δx0, Δy0) of the first partial fingerprint image 31 to the second partial fingerprint image 32 calculated as stated above and then outputs them to the external device 2. The communication means between the fingerprint input device 1 and the external device 2 is not limited, but can be of a wire communication type using, for example, parallel or serial transmissions, or wireless communication type, though it is not limited thereto. Moreover, the communication means for the partial fingerprint images can be different from the communication means for the relative location.

Thereafter, the second partial fingerprint image 32 is discarded from the second storage area 122 and the first partial fingerprint image 31 is transferred as the second partial fingerprint image 32 from the first storage area 121 to the second storage area 122. Subsequently, the latest partial fingerprint image, which is input from the fingerprint input section 11, is stored as the first partial fingerprint image 31 into the first storage area 121. The calculation is then made for a relative location between the partial fingerprint images 31 and 32 stored in the first and second storage areas 121 and 122 in the same manner as for the above.

The above operation is repeatedly executed until no fingerprint will be input any more from the fingerprint input section 11.

Figure 3:
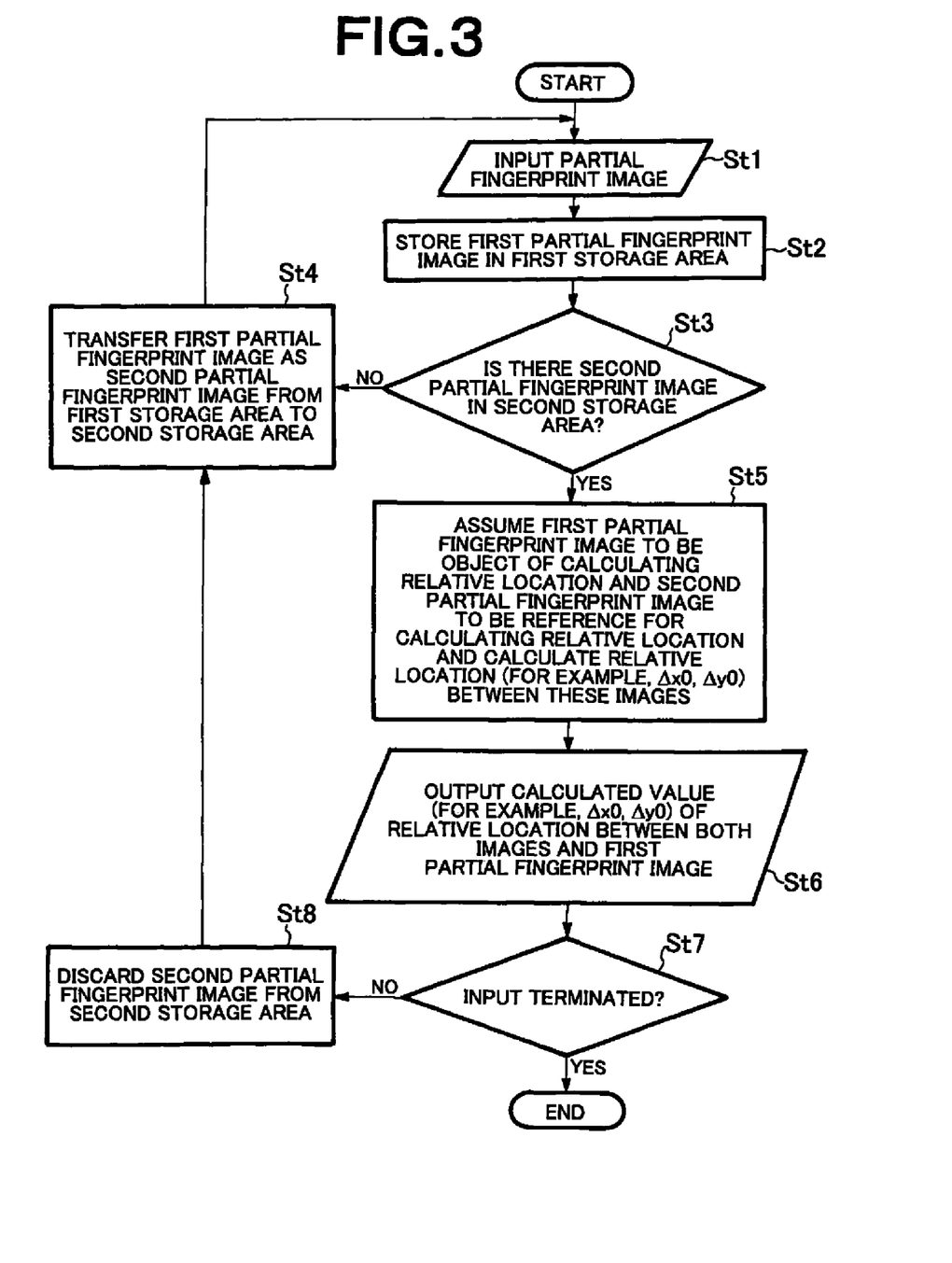
FIG. 3 is an overview flowchart showing an illustrative operation of the fingerprint input apparatus.

FIG. 3 shows an illustrative operation of the fingerprint input device 1 described hereinabove. A control program corresponding to the flowchart shown in FIG. 3 is previously stored, for example, in a memory not shown in the control section 15, and then a CPU, which is not shown, sequentially reads its instructions from the memory and executes them.

In FIG. 3, the control section 15 first gives a control command to the fingerprint input section 11 and inputs a partial fingerprint image whose area is smaller than the entire area of the fingerprint of the finger to be input from the fingerprint input section 11 (step St1). The control section 15 then stores it as the first partial fingerprint image 31 into the first storage area 121 (step St2).

Subsequently, the control section 15 determines whether or not the second partial fingerprint image 32 exists in the second storage area 122 (step St3).

At the time of the first fingerprint input, the second partial fingerprint image 32 does not exist in the second storage area 122. Therefore, the control section 15 determines it to be NO in the step St3. In this condition, the control section 15 shifts the first partial fingerprint image 31 as the second partial fingerprint image 32 from the first storage area 121 to the second storage area 122 (step St4), returns to the processing of the foregoing step St1, and executes the same processing as for the above from there.

At the time of the second and after fingerprint inputs, the second partial fingerprint image 32 exists in the second storage area 122. Therefore, the control section 15 determines YES in the step St3. In this condition, the control section 15 gives a control command to the operation section 13. The operation section 13 calculates the relative location with the first partial fingerprint image 31 assumed to be an object of calculating the relative location and the second partial fingerprint image 32 assumed to be a reference for calculating the relative location (step St5). Regarding the relative location calculated here, the image difference D ($\Delta x$, $\Delta y$) having the minimum absolute value is searched for to calculate ($\Delta x0$, $\Delta y0$), for example, by using the foregoing calculation method with a density distribution of the dots constituting the image.

Subsequently, the control section 15 outputs the calculated value ($\Delta x0$, $\Delta y0$) obtained by the operation section 13 and the first partial fingerprint image 31 stored in the first storage area 121 to the external device 2 via the communication section 14 (step St6).

Subsequently, the control section 15 determines whether or not the fingerprint input has been terminated (step St7) If the result is NO (not terminated), the second partial fingerprint image 32 is discarded from the second storage area 122 (step St8) and the control section 15 returns to the step S4. Thereby, the control section 15 shifts the first partial fingerprint image 31 as the second partial fingerprint image 32 from the first storage area 12 to the second storage area 122 (step St4), returns to the step St1, and thereafter repeatedly executes the same processing as for the above until it determines that the fingerprint input has been terminated (step St7: YES).

Therefore, according to this embodiment, a special device is unnecessary, though it has conventionally been required in the fingerprint input apparatus to detect the finger moving direction and distance. Thereby, a more inexpensive and compact fingerprint input apparatus can be manufactured and supplied.

Moreover, the movable part of the device that is no longer necessary is eliminated, thereby achieving a very reliable apparatus free from a breakdown and a trouble.

Furthermore, the calculation of the relative location of the partial fingerprint images, which has conventionally been performed by the external device connected to the fingerprint input apparatus, is performed by the fingerprint input apparatus, thereby eliminating a need for software processing for calculating the relative location between the partial fingerprint images, which has been required for the external device, and thus enabling simplification of software for the external device. This permits a reduction in a volume of software to be stored, thereby achieving downsizing and power saving of the apparatus.

Still further, it is possible to reduce the processing that has been performed by the external device again at the time of an input of the fingerprint, thereby enabling an execution of another processing such as, for example, image processing, which has conventionally been performed only after the end of the input of the fingerprint, during the input of the fingerprint by using the surplus processing power. Therefore, the entire processing time is reduced, thereby enabling a construction of a user-friendly apparatus that requires only a short period of time during which a user awaits the end of processing.

[Second Embodiment]

The first embodiment shown in FIGS. 1 to 3 has been illustrated by using the storing section 12 having an appropriate capacity for two partial fingerprint images. This embodiment, however, will be illustrated by using the storing section 12 having a capacity for three or more (for example, five) partial fingerprint images.

Figure 4:
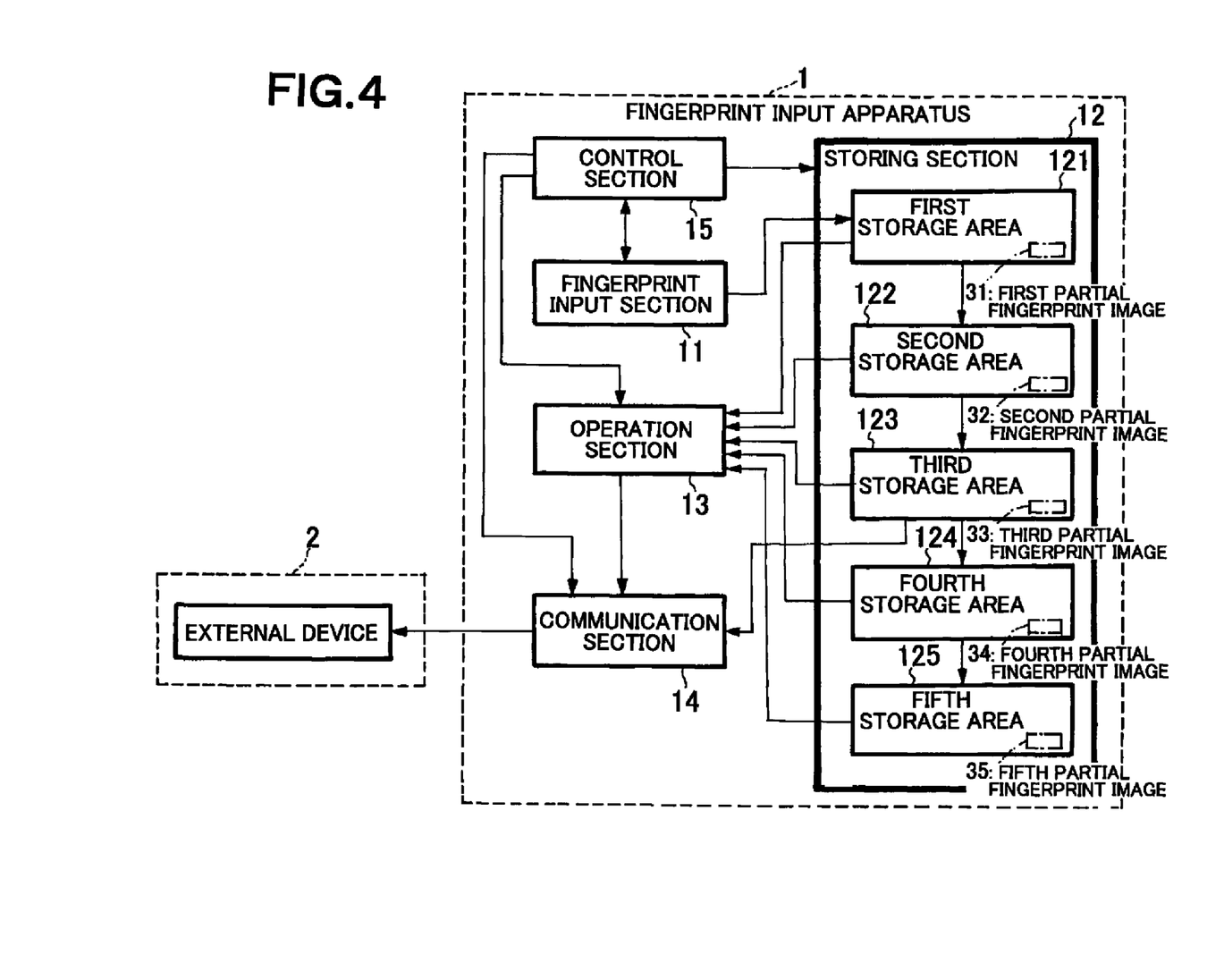
FIG. 4 is a schematic block diagram showing a configuration of a fingerprint input apparatus according to the second embodiment of the present invention.

Referring to FIG. 4, there is shown a block diagram of a configuration of a fingerprint input apparatus according to this embodiment.

In this embodiment, the latest partial fingerprint image is stored in the first storage area 121 in the storing section 12, the second latest partial fingerprint image is stored in the second storage area 122 in the storing section 12, and so on. Thus, the latest five partial fingerprint images (hereinafter, referred to as "the first to fifth partial fingerprint images") 31 to 35 are stored in the first storage area 121 to the fifth storage area 125 in the storing section 12, respectively.

When the storing section 12 stores three or more partial fingerprint images 31 to 35, the latest partial fingerprint image need not always be an object of calculating the relative location. In this embodiment, the third partial fingerprint image 33 stored in the third storage area 123 is used as an object of the calculation and the remaining first, second, fourth, and fifth partial fingerprint images 31, 32, 34, and 35 are used as reference images.

In the same method as one in the first embodiment shown in FIGS. 1 to 3, a calculation is made for the relative location between the partial fingerprint image stored in the storage area 123 and the partial fingerprint images stored in the first, second, fourth, and fifth storage areas 121, 122, 124, and 125, respectively. Thereby, four relative locations are acquired. Finally, given weighting is applied to these four relative locations to acquire the relative location between the third partial fingerprint image 33 stored in the third storage area 123 and the fourth partial fingerprint image 34 obtained just before that and stored in the fourth storage area 124.

By using both of the past and future partial fingerprint images as reference images for the partial fingerprint image to be an object of the calculation in this manner, errors in calculation are further reduced and a more accurate result than the first embodiment is obtained. Other operations are the same as those in the first embodiment, and therefore their descriptions are omitted here.

What is claimed is:

1. A fingerprint input apparatus for inputting a plurality of partial fingerprint images constituting a fingerprint image through a plurality of input times while moving a finger to acquire the fingerprint image, said fingerprint input apparatus comprising a microcomputer, said microcomputer comprising:
   an operation section configured to determine an intersection of the plurality of input partial fingerprint images, and to calculate a relative location between the plurality of partial fingerprint images on the basis of the intersection; and
   a communication section configured to output data of the relative location calculated by said operation section and to output the plurality of partial fingerprint images to an external device;
   wherein said plurality of partial fingerprint images comprises a plurality of prior partial fingerprint images and a latest partial fingerprint image; and
   said operation section assumes that any one of the plurality of prior partial fingerprint images is an object of the calculation, and one or more remaining prior partial fingerprint images and the latest partial fingerprint image are reference images, and calculates a plurality of relative locations, the plurality of relative locations comprising a relative location between the object of the calculation and each of the reference images, and weights the plurality of relative locations.

2. The fingerprint input apparatus according to claim 1, further comprising:
   an input section configured to input the plurality of partial fingerprint images; and
   a storing section having a plurality of storage areas corresponding to the plurality of partial fingerprint images.

3. The fingerprint input apparatus according to claim 2, wherein said input section is one of at least an optical sensor or a capacitance semiconductor sensor.

4. The fingerprint input apparatus according to claim 2, wherein said input section is smaller in area than the area of an entire fingerprint of a finger to be input.

5. The fingerprint input apparatus according to claim 1, wherein each of the plurality of relative locations is at least one of a moving direction, a moving distance, and an angle of rotation.

6. The fingerprint input apparatus according to claim 1, wherein said operation section determines the intersection on the basis of a density distribution of dots constituting each of the partial fingerprint images.

7. The fingerprint input apparatus according to claim 6, wherein said operation section determines the intersection by detecting the minimum sum total of differences in density of the dots constituting each of the partial fingerprint images.

8. The fingerprint input apparatus according to claim 1, wherein said operation section determines the intersection on the basis of a vector distribution of fingerprint ridges constituting each of the partial fingerprint images.

9. The fingerprint input apparatus according to claim 1, wherein said operation section determines the intersection on the basis of a frequency distribution in each of the partial fingerprint images.

10. The fingerprint input apparatus according to claim 1, further comprising:
    a first communication means for outputting the data of the relative location to the external device; and
    a second communication means for outputting the plurality of partial fingerprint images to the external device, wherein the first communication means is different from the second communication means.

11. The fingerprint input apparatus according to claim 1, further comprising:
    a control section for controlling operations of said operation section and said communication section.

12. A fingerprint inputting method used in a fingerprint input apparatus, the fingerprint inputting method comprising the steps of:
    using a microcomputer to perform the steps of:
       inputting a plurality of partial fingerprint images constituting a fingerprint image through a plurality of input times while moving a finger to acquire the fingerprint image, such that the plurality of fingerprint images comprises a plurality of prior partial fingerprint images and a latest partial fingerprint image;
       determining an intersection of the plurality of input partial fingerprint images;
       calculating a plurality of relative locations, the plurality of relative locations comprising a relative location between an object partial fingerprint image and each of a plurality of reference images on the basis of the intersection, wherein the object partial fingerprint image is one of the plurality of prior partial fingerprint images and the plurality of reference images comprises one or more remaining prior partial fingerprint images and the latest partial fingerprint image; and
    outputting the data of the plurality of relative locations and the plurality of partial fingerprint images to an external device.

* * * * *